US010046798B2

(12) United States Patent
Reeves

(10) Patent No.: US 10,046,798 B2
(45) Date of Patent: Aug. 14, 2018

(54) FOOT CONTROLLED STAND UP ZERO TURN RADIUS UTILITY VEHICLE

(71) Applicant: David Allan Reeves, Lakeland, FL (US)

(72) Inventor: David Allan Reeves, Lakeland, FL (US)

( * ) Notice: Subject to any disclaimer, the term of this patent is extended or adjusted under 35 U.S.C. 154(b) by 38 days.

(21) Appl. No.: 15/255,958

(22) Filed: Sep. 2, 2016

(65) Prior Publication Data

US 2018/0065663 A1    Mar. 8, 2018

(51) Int. Cl.
| | | |
|---|---|---|
| *B62D 11/06* | (2006.01) | |
| *B60L 11/18* | (2006.01) | |
| *B62D 51/00* | (2006.01) | |
| *B62D 51/02* | (2006.01) | |
| *B62D 37/00* | (2006.01) | |
| *B60P 3/30* | (2006.01) | |
| *B60L 15/20* | (2006.01) | |
| *B05B 9/00* | (2006.01) | |
| *B05B 9/04* | (2006.01) | |

(52) U.S. Cl.
CPC ............. *B62D 11/06* (2013.01); *B05B 9/007* (2013.01); *B05B 9/0403* (2013.01); *B60L 11/18* (2013.01); *B60L 15/2036* (2013.01); *B60P 3/30* (2013.01); *B62D 37/00* (2013.01); *B62D 51/001* (2013.01); *B62D 51/02* (2013.01); *B60L 2200/40* (2013.01); *B60L 2240/461* (2013.01); *B60L 2250/26* (2013.01)

(58) Field of Classification Search
CPC ...... B62D 11/06; B62D 37/00; B62D 51/001; B62D 51/02; B05B 9/007; B05B 9/0403; B60L 11/18; B60L 15/2036; B60L 2200/40; B60L 2240/461; B60L 2250/26; B60P 3/30

See application file for complete search history.

(56) References Cited

U.S. PATENT DOCUMENTS

| | | | | |
|---|---|---|---|---|
| 4,192,464 | A * | 3/1980 | Chow | B05B 9/0816 220/756 |
| 4,538,695 | A * | 9/1985 | Bradt | B60L 11/1805 180/19.2 |
| 4,716,980 | A * | 1/1988 | Butler | B62D 51/002 180/19.2 |

(Continued)

*Primary Examiner* — Jacob D Knutson
*Assistant Examiner* — Marlon A Arce
(74) *Attorney, Agent, or Firm* — Cygnet IP Law, P.A.; Stephen W. Aycock, II

(57) ABSTRACT

Some implementations can include a zero turn radius utility vehicle that is operated in a standing position by an operator using foot controls provided on the utility vehicle. Accordingly, the operator's hands are free to operate handheld equipment (e.g., a line trimmer, edger, blower, etc.) while the operator controls the utility vehicle via the foot controls. Further, the utility vehicle may have a single third wheel (and no mower deck or other deck or protrusion) extending from the front of the vehicle frame so as to minimize any protrusions to the front of the vehicle, which can permit the operator to work on the ground in front of the utility vehicle using handheld equipment without interference from a mower deck, while remaining in a standing position on the utility vehicle and being able to simultaneously control the utility vehicle (via foot controls) and perform work with handheld equipment.

14 Claims, 11 Drawing Sheets

(56) References Cited

U.S. PATENT DOCUMENTS

| | | | | |
|---|---|---|---|---|
| 4,886,294 A | * | 12/1989 | Nahachewski | B62J 27/00 |
| | | | | 280/755 |
| 6,273,212 B1 | * | 8/2001 | Husted | A61G 5/045 |
| | | | | 180/221 |
| 6,371,228 B1 | * | 4/2002 | Husted | A61G 5/045 |
| | | | | 180/65.1 |
| 7,942,224 B2 | * | 5/2011 | Marshall | B62K 5/01 |
| | | | | 180/273 |
| 8,091,672 B2 | * | 1/2012 | Gutsch | A01D 34/67 |
| | | | | 15/340.3 |
| 8,522,901 B1 | * | 9/2013 | VanLue | B60K 17/30 |
| | | | | 180/19.3 |
| 8,844,657 B2 | * | 9/2014 | Clark | B62D 11/04 |
| | | | | 180/315 |
| 2002/0054803 A1 | * | 5/2002 | Schmidt | B60P 7/0823 |
| | | | | 410/97 |
| 2003/0016999 A1 | * | 1/2003 | Jones, IV | E01C 7/187 |
| | | | | 404/111 |
| 2003/0213626 A1 | * | 11/2003 | Hafendorfer | B62D 1/02 |
| | | | | 180/6.48 |
| 2008/0238169 A1 | * | 10/2008 | Hicks | B60N 3/004 |
| | | | | 297/353 |
| 2012/0227368 A1 | * | 9/2012 | Koike | A01D 69/02 |
| | | | | 56/10.2 A |
| 2013/0175105 A1 | * | 7/2013 | Gallazzini | B62D 11/006 |
| | | | | 180/170 |

* cited by examiner

FOOT CONTROLLED STAND UP ZERO TURN RADIUS UTILITY VEHICLE

FIELD

Embodiments relate generally to utility vehicles, and, more particularly to a foot controlled stand up zero turn radius utility vehicle.

BACKGROUND

Some conventional utility vehicles may not be suitable for certain applications such as operating handheld equipment (e.g., line trimmer, edger, hedge trimmer, etc.) due to a need for some conventional vehicles to be operated by hand controls and/or due to the front of some conventional vehicles (e.g., a mower) having a platform or deck (e.g., for a mower blade or other equipment) extending out from the conventional vehicle such that operating handheld equipment to contact the ground (e.g., a line trimmer or edger) may be difficult or cumbersome.

One or more embodiments were conceived in light of the above-mentioned limitations or problems, among other things.

SUMMARY

Some implementations can include a zero turn radius (each drive wheel is independently controlled) utility vehicle that is operated in a standing position ("stand up") by an operator using foot controls provided on the utility vehicle. Accordingly, the operator's hands are free to operate handheld equipment (e.g., a line trimmer, edger, blower, etc.) while the operator controls the utility vehicle via the foot controls. Further, the utility vehicle may have a single third wheel (and no mower deck or other deck or protrusion) extending from the front of the vehicle frame so as to minimize any protrusions to the front, which can permit the operator to work on the ground in front of the utility vehicle using handheld equipment (e.g., line trimmer, edger, hedge trimmer, blower, etc.) without interference from a mower deck or the like, while remaining on the utility vehicle and being able to simultaneously control the utility vehicle (via foot controls) and perform work with handheld equipment.

Some implementations can include a utility vehicle comprising a frame having a single front caster wheel, a front operator support, a standing operation section, a rear operator support, a right rear drive wheel and a left rear drive wheel. The utility vehicle can also comprise an engine coupled to the frame and to a drive system configured to independently control respective speed and rotation direction of a left rear drive wheel and a right rear drive wheel. The utility vehicle can further comprise a foot control section disposed in the standing operation section having a left foot control, a stationary center portion and a right foot control, wherein the left and right foot controls are connected to the drive system, and wherein the left foot control controls the speed and direction of the left drive wheel and the right foot control controls the speed and direction of the right drive wheel. The stationary center portion can be elevated so as to extend above the left foot control and the right foot control.

The utility vehicle can also include a removable elevated standing platform having a standing section, railing, a first leg and a second leg. The first leg can be longer than the second leg. The utility vehicle can also include a sprayer system including a sprayer tank, a sprayer handle, a sprayer pump coupled to the tank and the sprayer handle. The utility vehicle can further comprise a sprayer handle holder disposed adjacent to the sprayer tank.

The utility vehicle can also include an accessory tray disposed on the rear operator support and extending toward the engine.

In some implementations, the engine can include a combustion engine and the utility vehicle can include a fuel tank coupled to the engine. In other implementations, the engine can include an electric motor and the utility vehicle can include a battery to power the electric motor.

The utility vehicle can also include an engine starter switch, a throttle control, and/or a brake control. The utility vehicle can further include a ballast weight disposed on an exterior of the front operator support.

The utility vehicle can also include an anti-tip device disposed on an exterior lower rear portion of the frame. The utility vehicle can include a trailer hitch disposed on an exterior lower rear portion of the frame.

DETAILED DESCRIPTION

It will be appreciated that the diagrams described herein are for illustration purposes and may not be to scale. Also, it will be appreciated that any dimensions described herein are example dimensions for illustration purposes and other dimensions may be used. Also, standard features of an engine and hydraulic drive system are not described herein for purposes of clarity of presenting the disclosed subject matter. A standard gasoline lawnmower engine can be used or a standard electric motor may be used. The hydraulic drive and an example foot control mechanism is described, for example, in U.S. Pat. No. 6,845,829, which is incorporated herein by reference.

Figure 1:
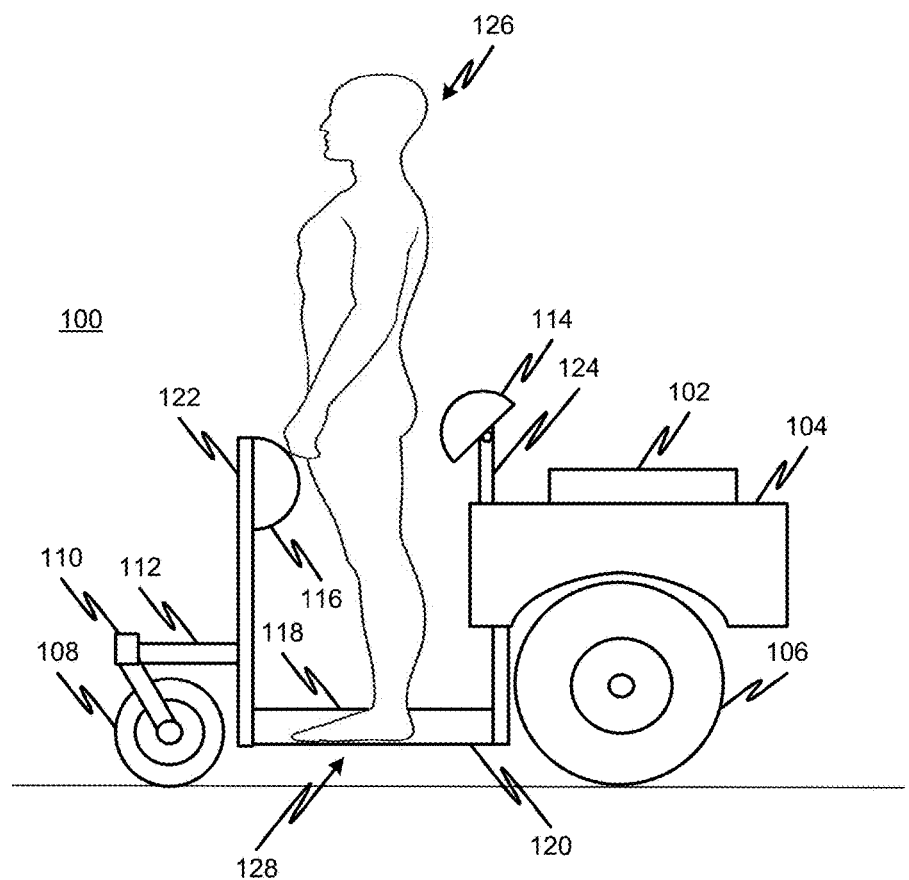
FIG. 1 is a diagram showing a side view of an example foot controlled zero turn radius stand up utility vehicle in accordance with some implementations.

FIG. 1 is a diagram showing a side view of an example foot controlled zero turn radius stand up utility vehicle in accordance with some implementations. In particular, a stand up zero turn utility vehicle with foot controls 100 can include an engine 102 (e.g., combustion engine or electric motor), a fuel tank (or battery) 104, a left side rear drive wheel 106, a right rear drive wheel (not shown in this view), a single front wheel 108, and a frame including: a front wheel caster 110, a front wheel support bracket 112, a rear driver support cushion 114, a front driver support cushion 116, a stationary section 118, a left foot control 120, a right foot control (not shown in this view), a front operator support 122, and a rear operator support 124. Some implementations can include dual front wheels that can have a smaller diameter than a single front wheel. A dual front wheel implementation can include two front wheel assemblies attached to the frame that are similar to the single front wheel assembly including 110 and 112, see, e.g., FIG. 11. The dual front wheels can be spaced apart and attached to the frame near respective sides.

Figure 2:
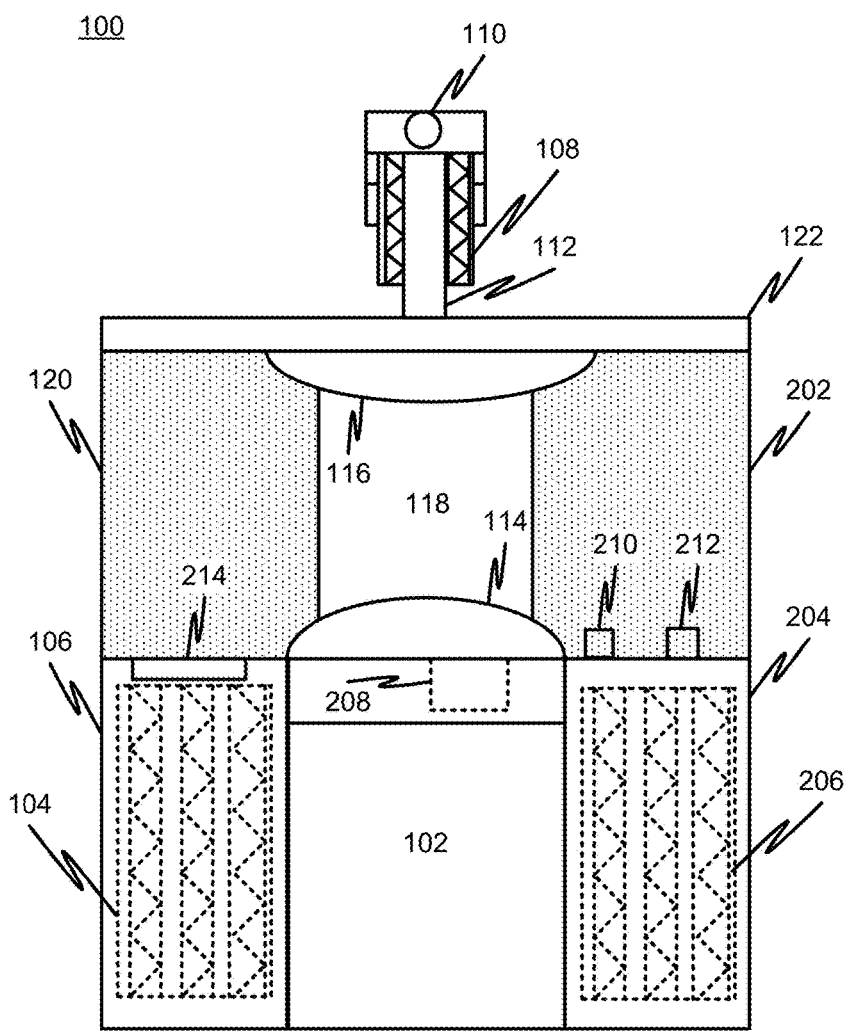
FIG. 2 is a diagram showing a top view of an example foot controlled zero turn radius stand up utility vehicle in accordance with some implementations.

In operation, an operator 126 stands within the standing operation section 128 (e.g., between the front operator support 122 and the rear operator support 124), sets the brake control (214, shown in FIG. 2), sets the throttle (210, shown in FIG. 2) and starts the engine using an ignition (or power) switch (212, shown in FIG. 2). Once the engine is running or (or powered on in the case of an electric motor), the operator can release the brake control (214) and cause the utility vehicle to move using the left and right foot controls as described in greater detail below. The operator 126 can support himself/herself using the front operator support 122 and front operator support cushion 116 and the rear operator support 124 and rear operator support cushion 114.

The ground clearance of the utility vehicle can be fixed or adjustable. In some implementation, the clearance between the bottom of the utility vehicle and the ground may be about 5.25 inches to permit the utility vehicle to move freely over lawns, such as those with St. Augustine grass, for example, while maintaining a relatively low center of gravity for stability.

An example utility vehicle may have overall dimensions of about 38.5 inches wide and about 54.5 inches long from the front of the front wheel to the rear of the vehicle, with a wheelbase of 35 inches. The front wheel can include a 13×5.00 tire and the rear drive wheels can include a wheel having a 20×7 or 18×8.50 tire, for example. The front wheel support bracket may extend about 12 inches from the front operator support 122, which may be about 27⅝ inches high measured from the ground. The top of the rear operator support cushion may be about 38¾ inches from the ground. The operator standing section 128 may be about 18 and ¾ inches from front operator support to rear operator support. The engine section may be about 23 inches from front to rear.

FIG. 2 is a diagram showing a top view of an example foot controlled zero turn radius stand up utility vehicle in accordance with some implementations. In FIG. 2, the left foot control 202, sprayer tank 204, and the left rear drive wheel 206 are visible. Also shown in FIG. 2 is an accessory tray 208 that is recessed into the rear operator support 124.

Figure 3:
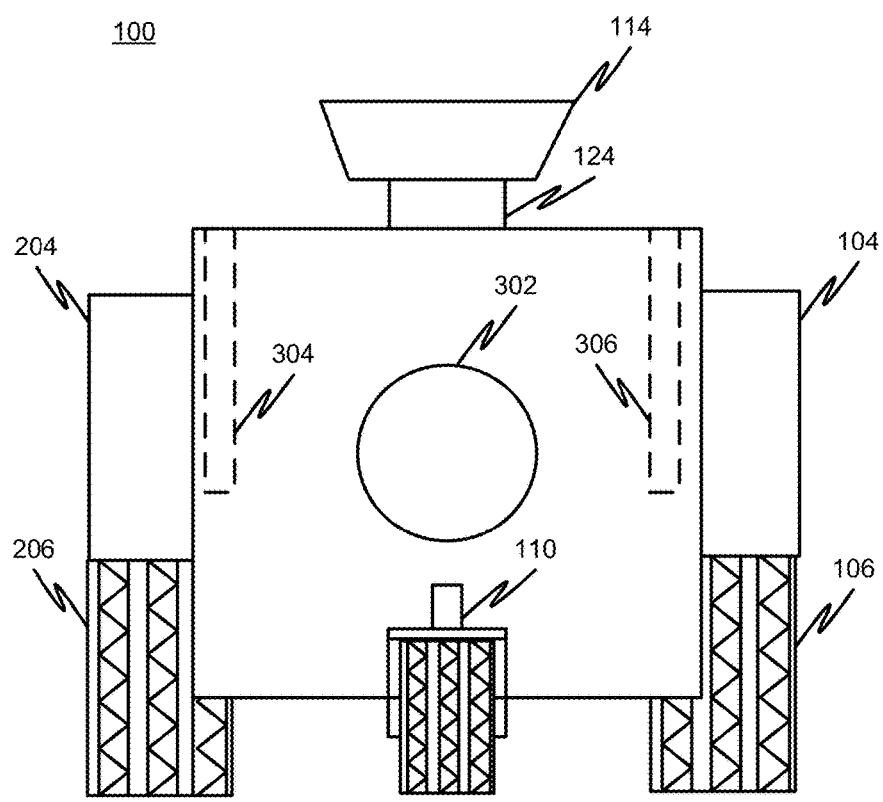
FIG. 3 is a diagram showing a front view of an example foot controlled zero turn radius stand up utility vehicle in accordance with some implementations.

FIG. 3 is a diagram showing a front view of an example foot controlled zero turn radius stand up utility vehicle in accordance with some implementations. In FIG. 3, a ballast weight 302 is shown attached to an exterior of the front operator support 122. The ballast weight 302 can be sized based on the specific implementations details of a utility vehicle and/or operator weight, height or other characteristics. Also, in FIG. 3, recesses 304 and 306 are shown. These recesses are provided for mounting a removable elevated standing platform as show in FIGS. 5-7.

Figure 4:
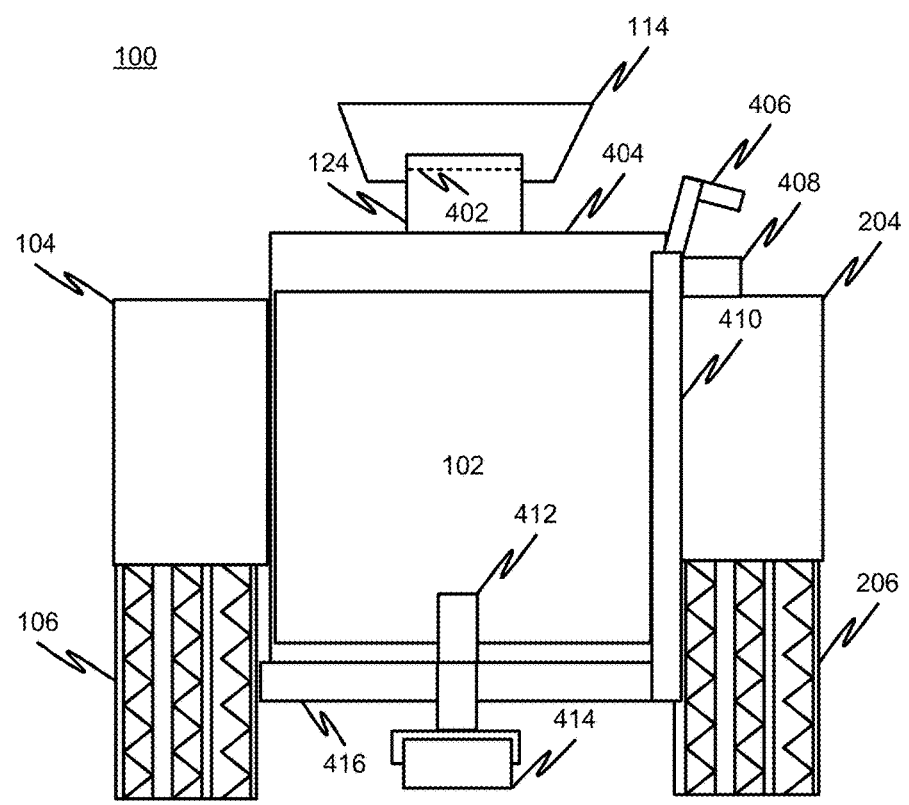
FIG. 4 is a diagram showing a back view of an example foot controlled zero turn radius stand up utility vehicle in accordance with some implementations.

FIG. 4 is a diagram showing a back view of an example foot controlled zero turn radius stand up utility vehicle in accordance with some implementations. In FIG. 4, a pivot member 402 is shown that permits the rear operator support cushion 114 to pivot in relation to the rear operator support 124. FIG. 4 also shows the rear operator support frame 404, a sprayer handle 406, a sprayer pump 408, and a spray handle holder 410 disposed adjacent to the sprayer tank 204. FIG. 4 also shows a hitch 412 and an anti-tip device 414 both attached to a lower rear portion of the utility vehicle frame.

Figure 5:
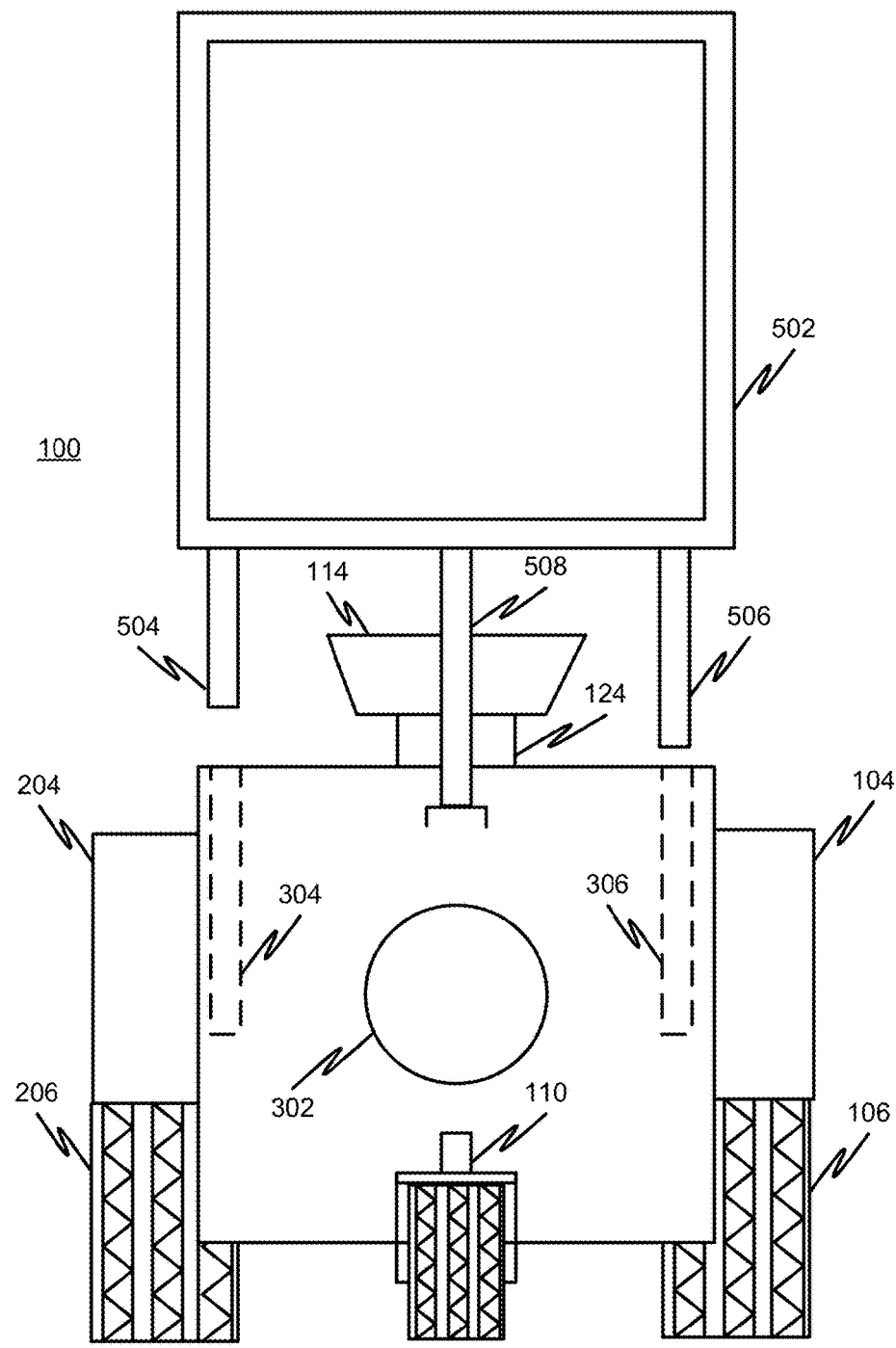
FIGS. 5-7 are diagrams showing a front view of an example foot controlled zero turn radius stand up utility vehicle with a raised standing platform being installed in accordance with some implementations.
Figure 6:
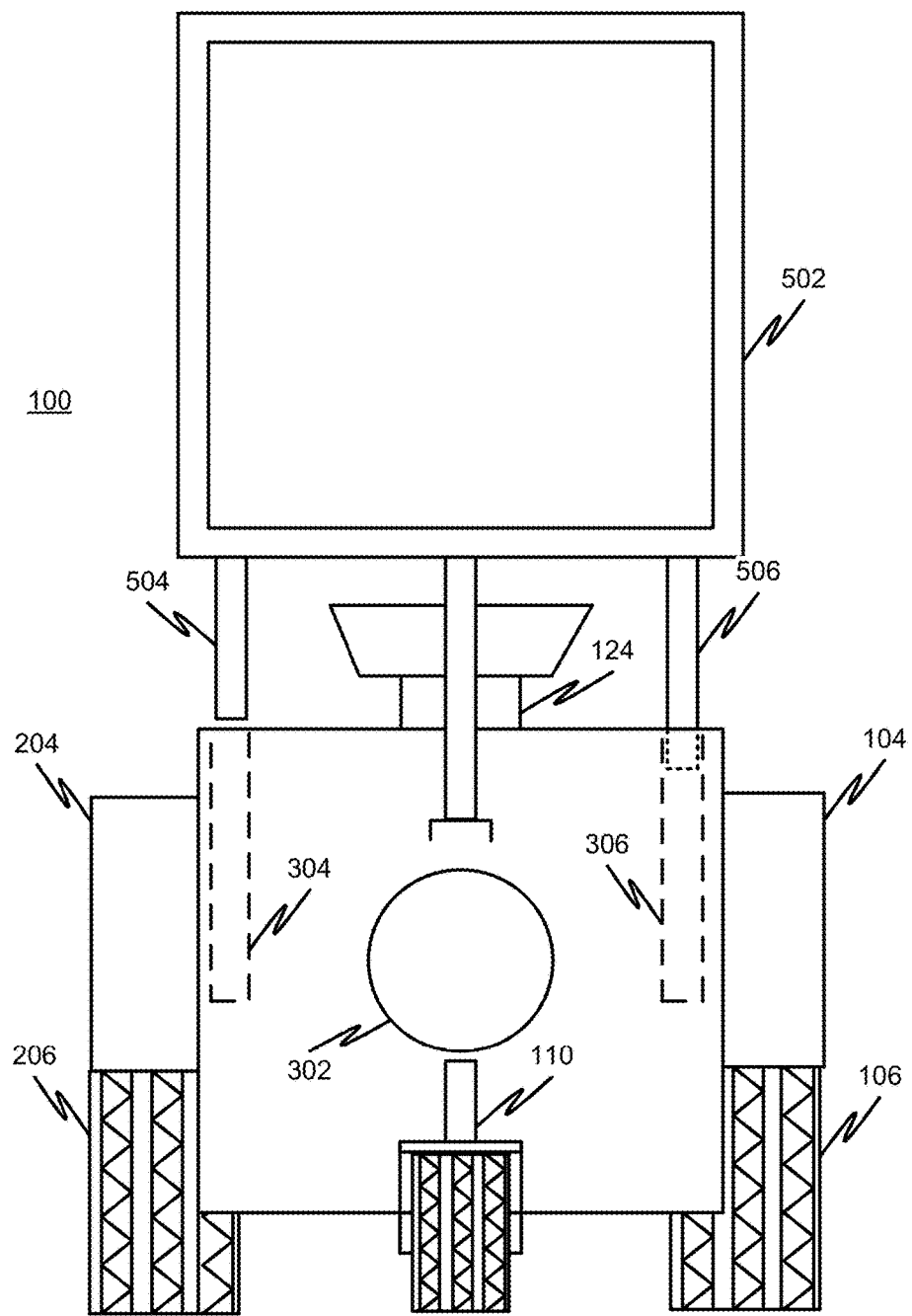
Figure 7:
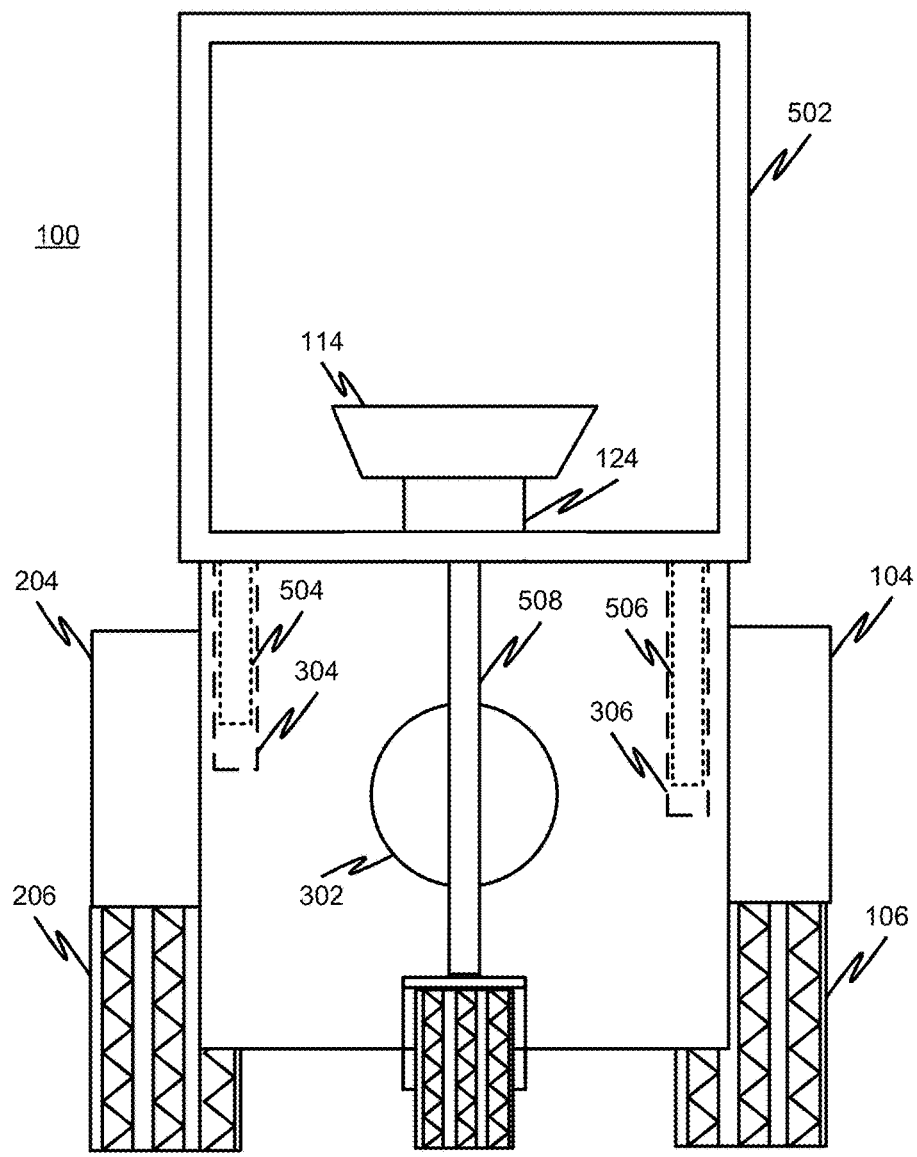
Figure 8:
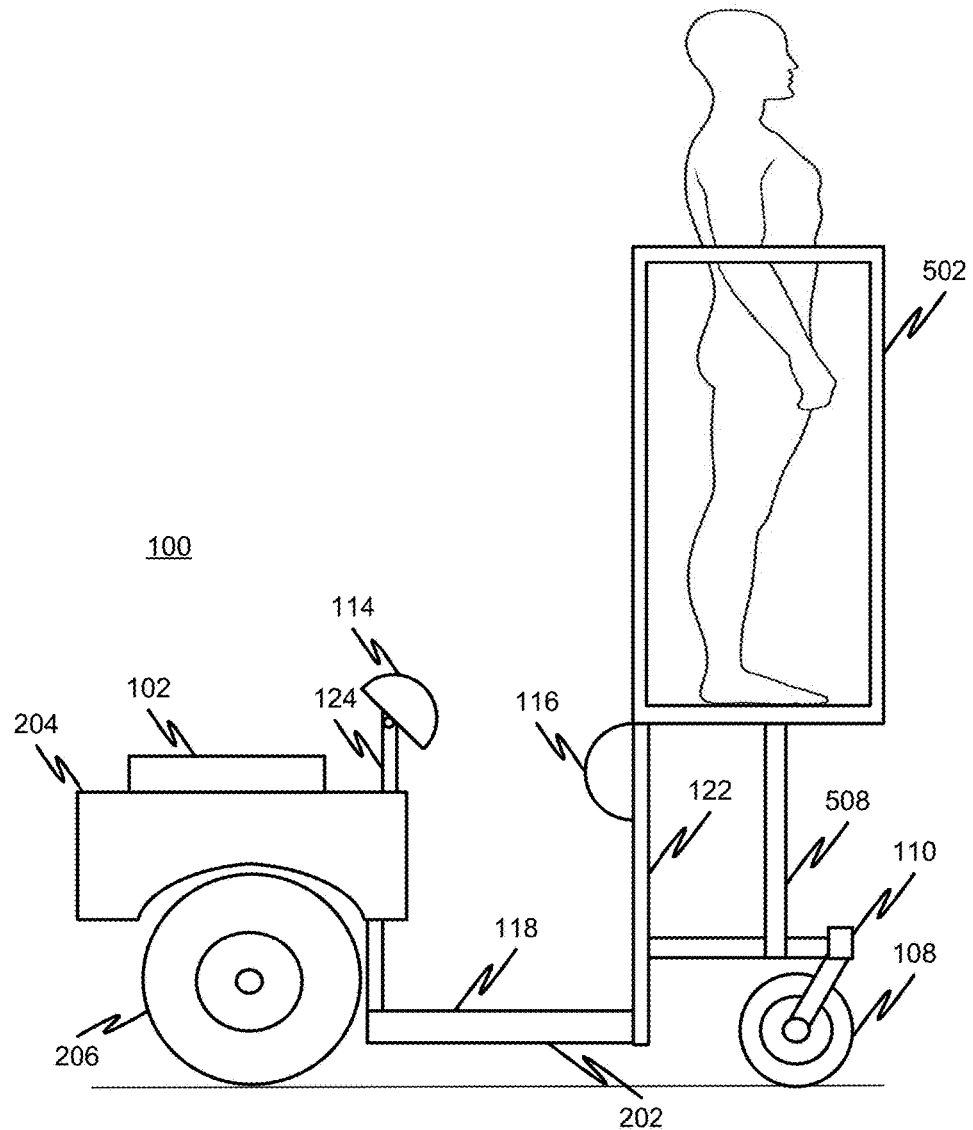
FIG. 8 is a diagram showing a side view of an example foot controlled zero turn radius stand up utility vehicle with a raised standing platform installed in accordance with some implementations.

FIGS. 5-7 are diagrams showing a front view of an example foot controlled zero turn radius stand up utility vehicle with an elevated standing platform being installed in accordance with some implementations. An elevated standing platform 502 includes a base for an operator to stand on (as shown in FIG. 8), a railing frame, and a first leg 504, a second leg 506, and an elevated standing platform support member 508. As shown in FIG. 5, the second leg 506 is longer than the first leg 504 to permit easier insertion of the legs into the corresponding recesses (304, 306) in the front operator support 122. As the elevated platform standing platform 502 is lower into position (FIG. 6), the second leg 506 engages with the recess 306 before the first leg 504 engages with its corresponding recess 304. This permits an operator to effectively attach the elevated standing platform 502 one leg at a time. The support member 508 is configured to extend downwardly and engage the front wheel support member 112 to provide additional support to the elevated platform.

FIG. 7 shows the elevated standing platform 502 fully installed with both legs (504, 506) fully inserted into corresponding recesses (304, 306).

FIG. 8 is a diagram showing a side view of an example foot controlled zero turn radius stand up utility vehicle 100 with an elevated standing platform 502 installed in accordance with some implementations and having an operator 126 standing on the platform. FIG. 8 also shows support member 508 engaged with the front wheel support member 112.

Figure 9:
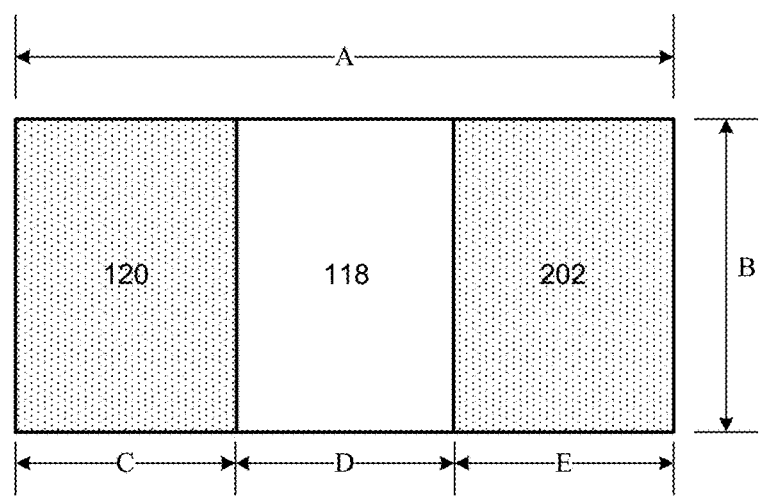
FIGS. 9 and 10 are diagrams showing details of example foot controls in accordance with some implementations.
Figure 10:
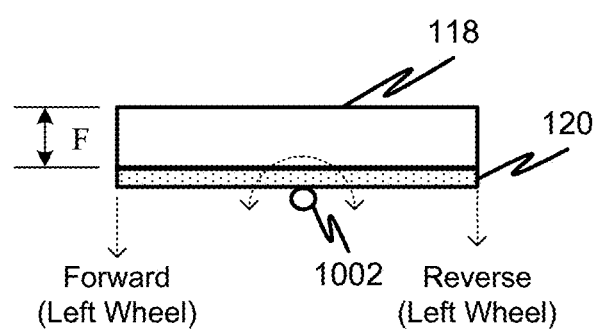

FIGS. 9 and 10 are diagrams showing details of example foot controls in accordance with some implementations. Example dimensions for the foot control section shown in FIG. 9 include an "A" dimension of about 26.25 inches, a "B" dimension of about 12.5 inches, a "C" dimension of about 7⅞ inches, a "D" dimension of about 10.5 inches, and an "E" dimension of about 7⅞ inches.

As shown in FIG. 10, the left foot control 120 rotates about a pivot hinge 1002 and can cause the left rear drive wheel to move in a forward direction when the foot control is pivoted in a first direction (e.g., toward the front of the utility vehicle) and in a reverse direction when the foot control is rotated in a second direction (e.g., toward the rear of the utility vehicle). The stationary section 118 has a height (dimension "F" in FIG. 10) of about 3.5 inches.

Figure 11:
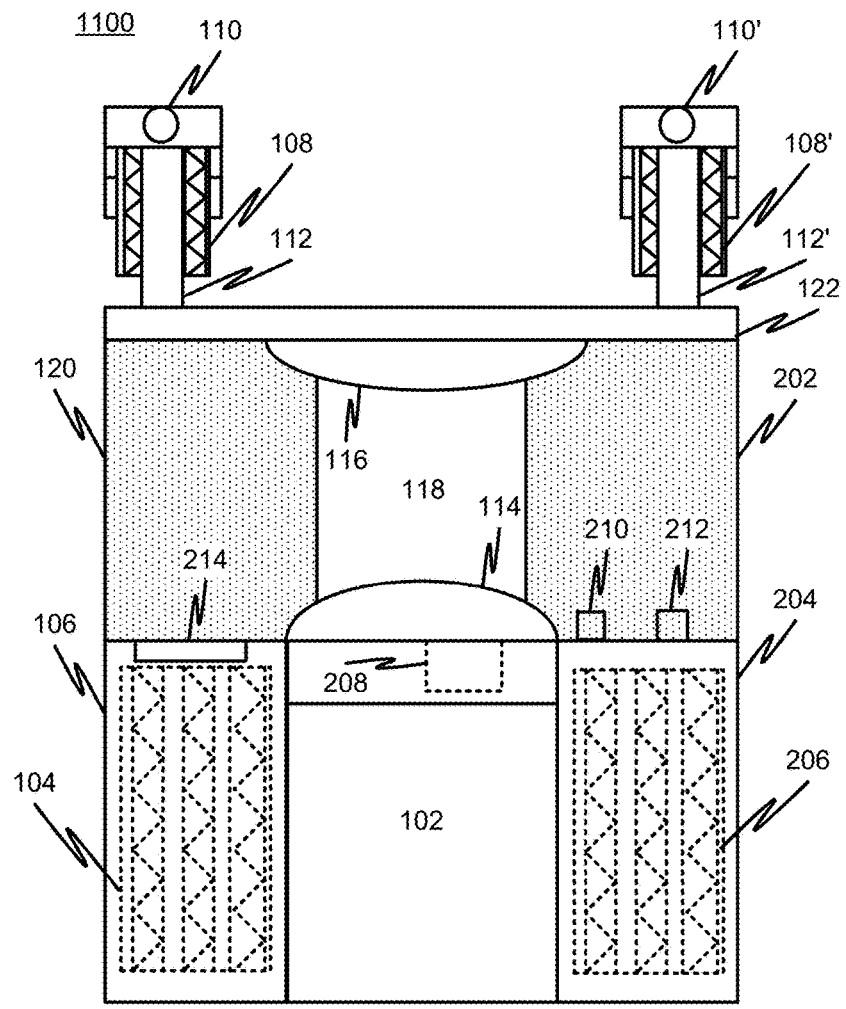
FIG. 11 is a diagram showing a top view of an example foot controlled zero turn radius stand up utility vehicle in accordance with some implementations.

FIG. 11 shows an example implementation of a foot controlled zero turn radius stand up utility vehicle 1100 having two front wheels and front wheel assemblies, which include a first front wheel assembly including a first front wheel 108, a first front wheel caster 110, a first front wheel support bracket 112, and a second front wheel assembly including a second front wheel 108', a second front wheel caster 110', a second front wheel support bracket 112'.

It is, therefore, apparent that there is provided, in accordance with the various embodiments disclosed herein, a foot controlled zero turn radius stand up utility vehicle.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A utility vehicle comprising:
   a frame having a single front caster wheel, a front operator support, a standing operation section, a rear operator support, a right rear drive wheel and a left rear drive wheel;
   an engine coupled to the frame and to a drive system configured to independently control respective speed and rotational direction of the left rear drive wheel and the right rear drive wheel;
   a foot control section disposed in the standing operation section, wherein the foot control section includes a left foot control, a stationary center portion and a right foot control, wherein the left foot control and the right foot control are connected to the drive system, and wherein the left foot control is operable to control speed and rotational direction of the left rear drive wheel and the right foot control is operable to control speed and rotational direction of the right rear drive wheel; and
   a removable elevated standing platform having a standing section, railing, a first leg, a second leg, and an elevated platform support member connected to the removable elevated standing platform and configured to engage a front wheel support member.

2. The utility vehicle of claim 1, wherein the stationary center portion is elevated so as to extend above the left foot control and the right foot control.

3. The utility vehicle of claim 1, wherein the first leg is longer than the second leg.

4. The utility vehicle of claim 1, further comprising a sprayer system including a sprayer tank, a sprayer handle, a sprayer pump coupled to the sprayer tank and the sprayer handle.

5. The utility vehicle of claim 4, further comprising a sprayer handle holder disposed adjacent to the sprayer tank.

6. The utility vehicle of claim 1, further comprising an accessory tray disposed on the rear operator support and extending toward the engine.

7. The utility vehicle of claim 1, wherein the engine is a combustion engine and the utility vehicle includes a fuel tank coupled to the engine.

8. The utility vehicle of claim 1, wherein the engine is an electric motor and the utility vehicle includes a battery to power the electric motor.

9. The utility vehicle of claim 1, further comprising an engine starter switch.

10. The utility vehicle of claim 1, further comprising a throttle control.

11. The utility vehicle of claim 1, further comprising a brake control.

12. The utility vehicle of claim 1, further comprising a ballast weight disposed on an exterior of the front operator support.

13. The utility vehicle of claim 1, further comprising an anti-tip device disposed on an exterior lower rear portion of the frame.

14. The utility vehicle of claim 1, further comprising a trailer hitch disposed on an exterior lower rear portion of the frame.

* * * * *